(12) United States Patent
Gzym et al.

(10) Patent No.: US 9,964,237 B2
(45) Date of Patent: May 8, 2018

(54) HOSE SHROUD

(71) Applicant: NLB Corp., Wixom, MI (US)

(72) Inventors: Cam Gzym, Ann Arbor, MI (US); Matthew O. Herhold, Fenton, MI (US)

(73) Assignee: NLB Corp., Wixom, MI (US)

( * ) Notice: Subject to any disclaimer, the term of this patent is extended or adjusted under 35 U.S.C. 154(b) by 143 days.

(21) Appl. No.: 15/053,686

(22) Filed: Feb. 25, 2016

(65) Prior Publication Data

US 2017/0248254 A1  Aug. 31, 2017

(51) Int. Cl.
F16L 9/12 (2006.01)
F16L 11/08 (2006.01)

(52) U.S. Cl.
CPC .................. F16L 11/085 (2013.01)

(58) Field of Classification Search
CPC .................. F16L 55/005; F16L 9/12
USPC .......... 138/110, 99, 123, 124; 285/305, 394
See application file for complete search history.

(56) References Cited

U.S. PATENT DOCUMENTS

| | | | |
|---|---|---|---|
| 3,124,374 A | 3/1964 | Krapp | |
| 3,831,635 A | 8/1974 | Burton | |
| 4,181,157 A | 1/1980 | Decamp | |
| 4,345,624 A | 8/1982 | Rider | |
| 4,384,595 A | 5/1983 | Washkewicz et al. | |
| 4,805,933 A | 2/1989 | Swisher | |
| 5,062,457 A * | 11/1991 | Timmons | F16L 11/088 138/109 |
| 5,435,604 A | 7/1995 | Chen | |
| 5,518,568 A | 5/1996 | Fawley et al. | |
| 5,816,622 A | 10/1998 | Carter | |
| 5,857,711 A | 1/1999 | Comin-DuMong et al. | |
| 5,914,163 A * | 6/1999 | Browne | B32B 5/28 138/119 |
| 5,988,693 A | 11/1999 | Street | |
| 6,015,168 A | 1/2000 | Fahl | |
| 6,039,066 A | 3/2000 | Selby | |
| 6,206,431 B1 | 3/2001 | Street | |
| 6,298,882 B1 * | 10/2001 | Hayes | F16L 55/005 138/110 |
| 6,446,661 B2 | 9/2002 | Armenia et al. | |
| 7,168,451 B1 * | 1/2007 | Dundas | F16L 57/04 138/109 |
| 7,264,021 B1 | 9/2007 | Daikai | |
| 7,543,857 B2 | 6/2009 | Dole | |
| 7,895,716 B2 * | 3/2011 | Taillon | F16L 3/14 174/135 |
| 8,083,265 B1 | 12/2011 | Chen | |
| 8,141,593 B2 | 3/2012 | Francois et al. | |
| 8,561,647 B2 | 10/2013 | Gray | |
| 8,955,552 B2 | 2/2015 | Nanney et al. | |

(Continued)

FOREIGN PATENT DOCUMENTS

WO       0142703 A1    6/2001

OTHER PUBLICATIONS

Waterjet Protection with Dyneema®, Catalog, TST Sweden AB, www.TST-Sweden.com.

*Primary Examiner* — Patrick F Brinson
(74) *Attorney, Agent, or Firm* — Carlson, Gaskey & Olds, P.C.

(57) ABSTRACT

A hose shroud comprises a tube formed from an aramid fabric rolled into a plurality of tubular layers. The hose shroud has a first end fitting at a first end of the tube, and a second end fitting at a second end of the tube.

21 Claims, 4 Drawing Sheets

(56) References Cited

U.S. PATENT DOCUMENTS

| | | |
|---|---|---|
| 9,052,042 B2 | 6/2015 | May |
| 9,115,831 B2 | 8/2015 | Lamontia et al. |
| RE45,673 E | 9/2015 | Russell |
| 2003/0029277 A1 | 2/2003 | Lummis |
| 2011/0221188 A1 | 9/2011 | Fuller et al. |
| 2012/0042980 A1 | 2/2012 | Mezzalira et al. |
| 2012/0291903 A1* | 11/2012 | Ekelund ............... B29C 53/805 138/97 |
| 2013/0315675 A1* | 11/2013 | Pajak ..................... F16L 57/06 405/184 |
| 2014/0284921 A1 | 9/2014 | van der Valk |
| 2014/0345738 A1 | 11/2014 | Hill et al. |
| 2015/0354742 A1 | 12/2015 | Holtby et al. |

\* cited by examiner

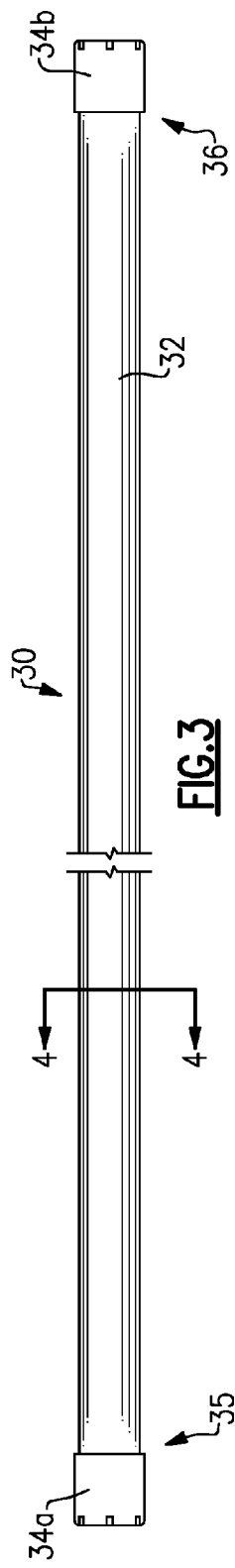
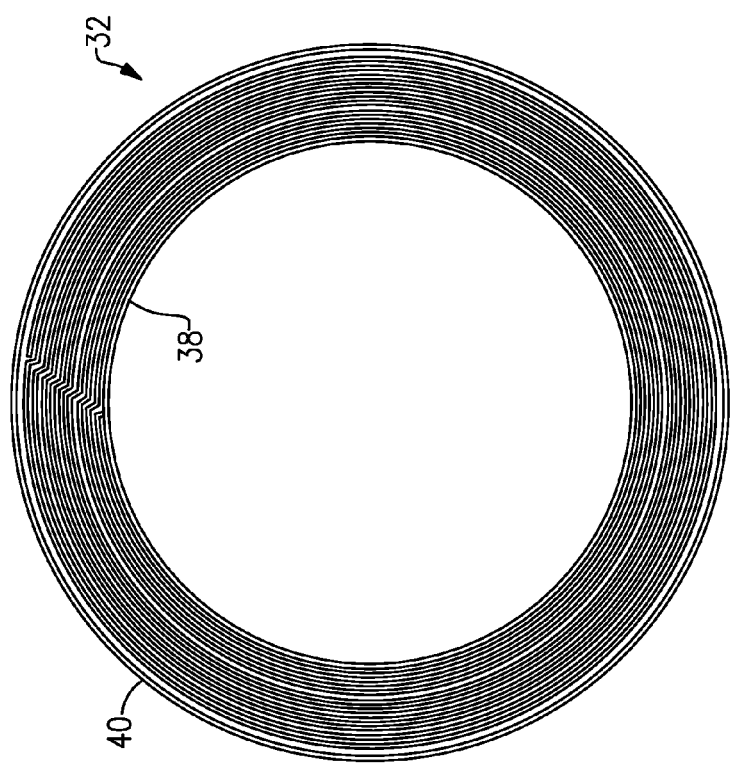

HOSE SHROUD

BACKGROUND OF THE INVENTION

This application relates to a high-pressure hose safety shroud for shielding an operator of high pressure water blasting equipment in the event of a rupture.

High pressure water blasting systems are known, and are used to apply very high pressure fluid against surfaces to be cleaned. In such systems, a hand-held lance is configured to selectively expel high pressure fluid via a nozzle. Typically, a pump delivers high pressure water to the lance. As an example, pressures of approximately 40,000 psi may be used.

An operator positions the lance to direct the high pressure fluid. In current systems, the operator is protected from a rupture of the hose or hose fittings by wearing protective equipment and/or a shroud of braded wire hose covered in ballistic material provided adjacent the lance.

SUMMARY OF THE INVENTION

In one aspect of this disclosure, a hose shroud comprises a tube formed from an aramid fabric rolled into a plurality of tubular layers. The hose shroud has a first end fitting at a first end of the tube and a second end fitting at a second end of the tube.

In another aspect of this disclosure, a hose shroud comprises a tube having a plurality of aramid fabric layers and a first end fitting at a first end of the tube. The first end fitting comprises a cam lock component configured to attach to a high pressure lance, covering a high pressure hose and hose connection.

In another aspect of this disclosure, a hose shroud comprises a tube having a plurality of aramid fabric layers and a first end fitting at a first end of the tube. The first end fitting comprises a threaded component configured to attach to a lance of a high pressure hose covering the hose and hose connection.

These and other features of the present invention can be best understood from the following specification and drawings, the following of which is a brief description.

BRIEF DESCRIPTION OF THE DRAWINGS

FIG. 3 shows an embodiment of a hose shroud.

FIG. 4 shows a cross-sectional view of a hose shroud taken along line 4-4.

DETAILED DESCRIPTION OF THE PREFERRED EMBODIMENT

Figure 1:
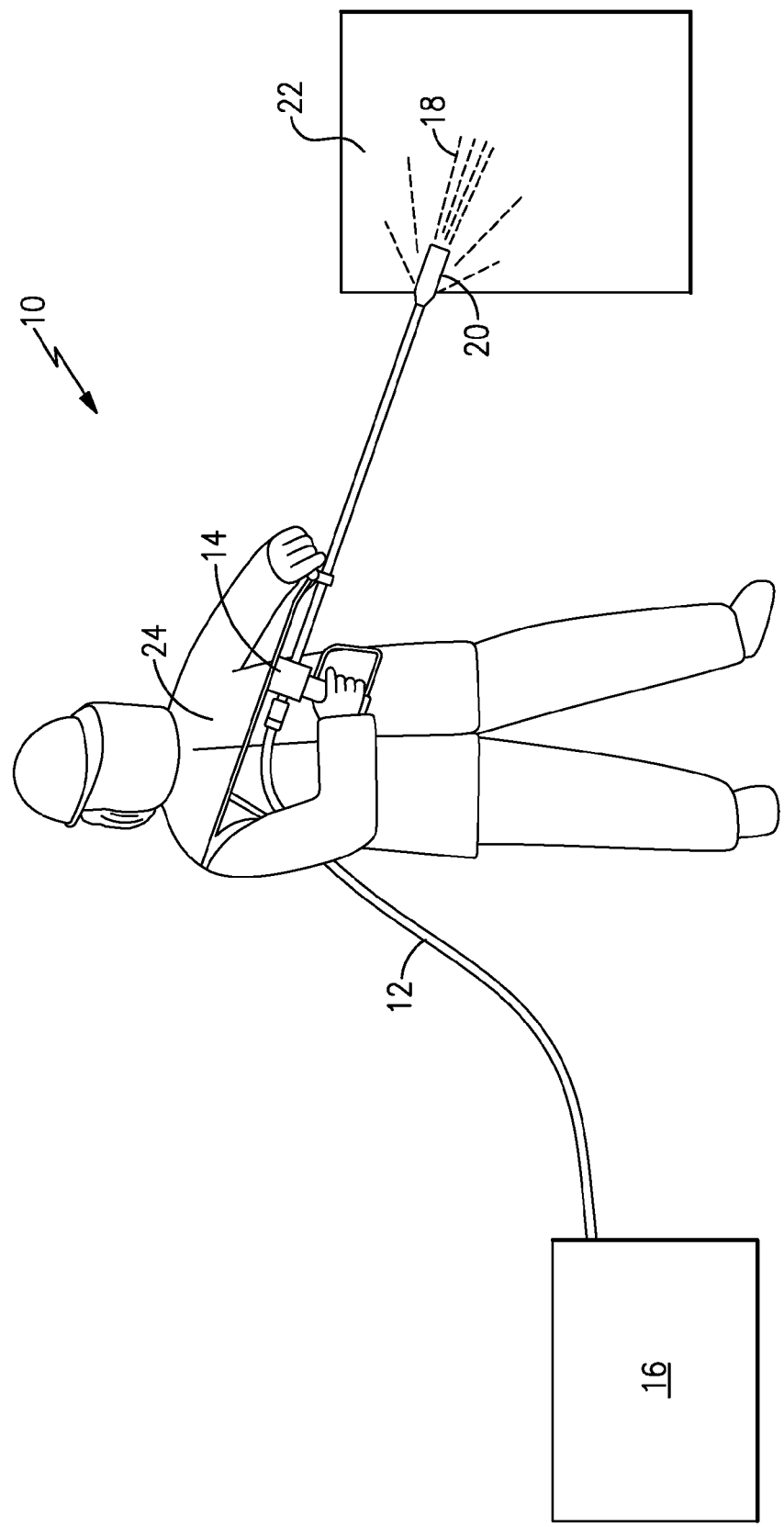
FIG. 1 schematically shows a cleaning system.

With reference to FIG. 1, an example cleaning system 10 includes a hose 12 and a lance 14, which is provided with a high pressure fluid from a source 16. The high pressure fluid 18 jets outwardly of a nozzle 20 and against a surface 22 to be cleaned. In some examples, the high pressure fluid is water. Generally, an operator 24 is required to manually position the lance 14 relative to the surface 22.

Figure 2:
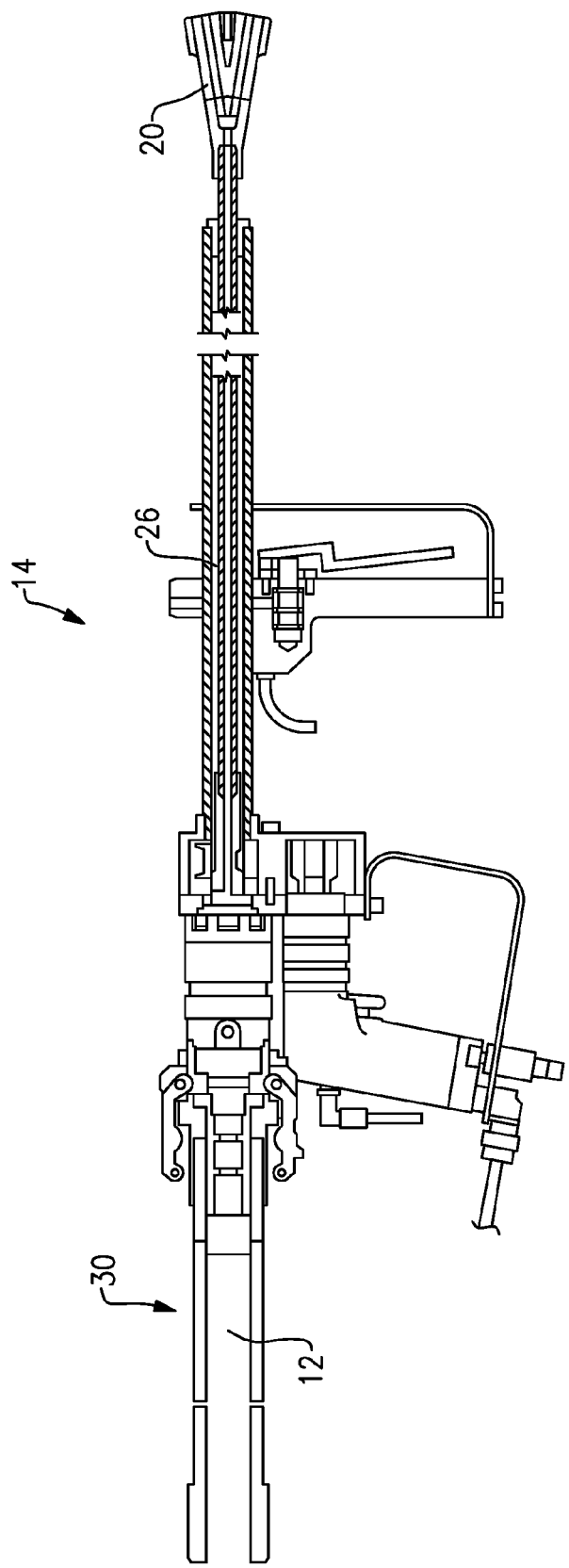
FIG. 2 shows an exemplary lance and an exemplary hose shroud.

An exemplary lance 14 is illustrated in FIG. 2. The lance 14 is hand held and has a stationary housing 26 mounting the nozzle 20. In the illustrated example, the nozzle 20 is a rotating nozzle. While a particular lance 14 is shown, it should be understood that the present application extends to other types of systems for blasting fluids, and for any system having a high pressure hose.

A hose shroud 30 surrounds a portion of the hose 12 and, in this example, attaches to the lance 14. The hose shroud 30 protects the operator 24 from the high pressure fluid 18 in the event of a hose burst 12.

An exemplary embodiment of the hose shroud 30 is shown in FIG. 3. The hose shroud includes a tube 32, and first and second end fittings 34a, 34b at a first end 35 and a second end 36.

In this example, the tube 32 is formed of a roll of an aramid fabric, as shown in FIG. 4. In an embodiment, a sheet of aramid fabric is rolled to form a first layer 38, and secured with an adhesive, such as double sided tape, or stitched with thread. The sheet of aramid fabric is then rolled several more times, and secured on the outer diameter with adhesive, such as double sided tape, or stitched with thread. In some embodiments, the tube 32 includes at least nine tubular layers of aramid fabric. In other embodiments, the tube 32 includes 9-12 tubular layers of aramid fabric. In other examples, a larger or smaller number of layers of aramid fabric may be used. The aramid fabric may be wrapped around a mandrel, for example, to form the tube 32. In one embodiment, the outer diameter of the tube 32 is about 1.9 inches. In other embodiments, the outer diameter of the tube 32 is between about 1.5 and 3 inches, however other diameters may come within the scope of this disclosure.

In an embodiment, the aramid fabric is Kevlar®. In an embodiment, the aramid fabric has a thread count of 70×70 and a thickness of 0.007 inches. In a further embodiment, the aramid fabric is Kevlar® 159, style 779. This is only one example and other thickness and thread counts may come within the scope of this disclosure. The tube 32 is responsible for energy dissipation in the event of a hose rupture. If the hose ruptures, the high pressure fluid will be trapped by the shroud and directed away from the lance, preventing injury to the operator. In some examples, the hose 12 includes a metal braid, which is also trapped by the shroud. In the event that the high pressure fluid travels radially outwardly from the hose, the many layers of the shroud dissipate energy from the high pressure fluid. The tensile strength of the aramid fabric, tight weave of the aramid fabric, and rolled construction of the shroud successfully dissipate energy from a hose rupture.

In an embodiment, a vinyl material is rolled around the aramid fabric layers to form an abrasion resistant covering 40. In an example, the vinyl material is 18-ounce vinyl coated polyester material. In an example, a piece of vinyl which may be seven to nine inches wide is wrapped around the aramid fabric layers such that it overlaps itself by approximately one inch and secured to itself with an adhesive, such as vinyl adhesive. It should be understood that a larger or smaller pieces of vinyl may be used for larger or smaller shrouds.

Figure 5:
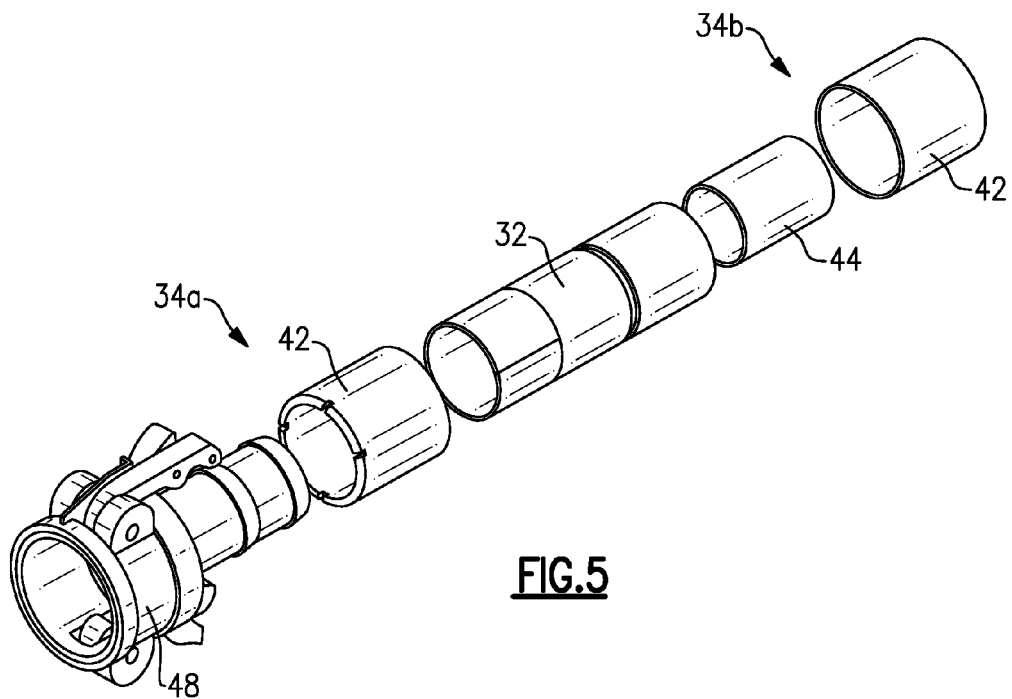
FIG. 5 shows an exploded perspective view of an embodiment of a hose shroud in which a fitting includes a cam lock.

After the tube 32 is constructed, the end fittings 34a, 34b are installed and secured to the tube, as shown in FIG. 3. In one example shown in FIG. 5, the end fitting 34b includes a ferrule 42 and a tube 44. The ferrule 42 is slid over an end of the aramid fabric tube 32, and the tube 44 is slid inside the aramid fabric tube 32. The ferrule 42 is then crimped down on the tube 44, securing the aramid fabric tube 32 between the ferrule 42 and the tube 44. The ferrule 42 may be stainless steel and the tube 44 may be aluminum, or stainless steel, for example. In a further example, the tube 44 is a 2 inch long piece of 1.5 inch aluminum, or stainless steel, tube. The end fittings 34a, 34b further secure the aramid fabric tube layers from unrolling.

In some embodiments, the end fitting 34a includes a cam lock component 48 for attaching the shroud to a lance, which would include a complementary cam lock component. In this example, the ferrule 42 is slid over the aramid fabric tube 32 and the cam lock component 48 is slid inside the aramid fabric tube 32. Then the ferrule 42 is crimped down on the cam lock component 48. The cam lock component inserted into the aramid fabric tube 32 may be the male component or the female component of a cam lock assembly. In an example, the cam lock component 48 is a 1.5 inch, Type C cam and groove fitting with hose barb.

Figure 6:
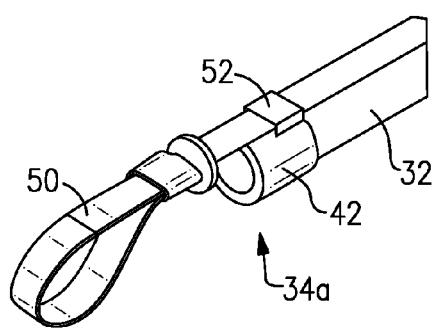
FIG. 6 shows another embodiment of a hose shroud in which a fitting includes a whip-check strap.
Figure 7:
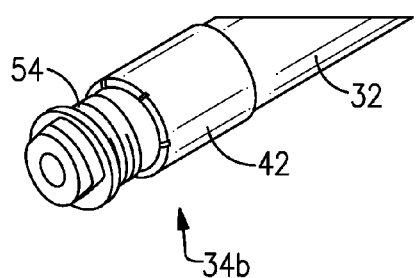
FIG. 7 shows another embodiment of a hose shroud in which a fitting includes a threaded component.

In other embodiments, as shown in FIGS. 6 and 7, other types of end fittings 34a, 34b may be used. As illustrated in FIG. 6, a whip-check strap 50 may be used at one or both ends 35, 36. In the shown example, the end fitting 34a includes a whip-check strap 50, which is attached to the ferrule 42 via at least one metal loop 52 on the ferrule 42. In other examples, the whip-check strap 50 may be crimped between the aramid fabric tube 32 and the ferrule 42 to secure the whip-check strap 50 to the shroud 30. When the shroud 30 is installed on a hose 12, the hose 12 is fed through the whip-check strap 50. When the whip-check strap 50 is placed in tension, the whip-check strap 50 constricts on the hose 12, holding the shroud 30 in place. The whip-check strap 50 allows the shroud 30 to hold its position on the hose 12 in the event of a rupture.

As illustrated in FIG. 7, a threaded shroud nut 54 may be used at one or both ends of the shroud 35, 36. In this example, the end fitting 34b threads onto a corresponding fitting on the shroud 30 and is retained by the lance 14.

The hose shroud 30 may have the same type of end fittings 34a, 34b at each end of the shroud 30. Alternatively, the hose shroud 30 may have different types of end fittings 34a, 34b at opposite ends 35, 36 of the shroud 30. In some embodiments, the hose shroud 30 is configured to be attached to a lance 14. In other embodiments, the hose shroud 30 may be used over another portion of the hose 12. For example, a hose shroud 30 having a whip check strap 50 at both ends 35, 36 may be used over a coupling linking two hoses, or covering any hose to which people may be exposed.

Although the different examples have a specific component shown in the illustrations, embodiments of this disclosure are not limited to those particular combinations. It is possible to use some of the components or features from one of the examples in combination with features or components from another one of the examples. Also, although particular step sequences are shown, described, and claimed, it should be understood that steps may be performed in any order, separated or combined unless otherwise indicated and will still benefit from the present disclosure.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A hose shroud, comprising:
   a tube formed from a single sheet of an aramid fabric that is rolled multiple times to form the tube having a plurality of layers;
   a first end fitting at a first end of the tube; and
   a second end fitting at a second end of the tube.

2. The hose shroud of claim 1, wherein the tube has at least nine layers of aramid fabric.

3. The hose shroud of claim 2, wherein the tube has between 9 and 12 layers of aramid fabric.

4. The hose shroud of claim 1, wherein the aramid fabric has a thread count of 70×70 and a thickness of 0.007 inches.

5. The hose shroud of claim 1, comprising a vinyl material covering an outermost layer of the plurality of tubular layers to form an outer covering.

6. The hose shroud of claim 5, wherein the vinyl material is 18 ounce vinyl coated polyester fabric.

7. The hose shroud of claim 1, wherein at least one of the tubular layers is secured with an adhesive, or stitching.

8. The hose shroud of claim 1, wherein the first and second end fittings comprise a ferrule.

9. The hose shroud of claim 1, wherein the tube is configured to fit over a high pressure hose.

10. The hose shroud of claim 1, wherein one of the first end fitting and the second end fitting comprises one of a cam lock component, a whip-check strap, and a threaded shroud nut.

11. The hose shroud of claim 1, wherein at least one of the first end fitting and the second end fitting comprises a whip-check strap configured to constrict a high pressure hose in the event of a hose rupture.

12. A hose shroud, comprising
   a tube having a plurality of aramid fabric layers;
   a first end fitting at a first end of the tube;
   wherein said first end fitting comprises a cam lock component configured to attach the shroud to a high pressure lance covering a high pressure hose and connection.

13. The hose shroud of claim 12, wherein the cam lock component is a female cam lock component.

14. The hose shroud of claim 12, wherein the cam lock component is a male cam lock component.

15. The hose shroud of claim 12, wherein the tube has at least nine layers of aramid fabric.

16. The hose shroud of claim 15, wherein the tube has between 9 and 12 layers of aramid fabric.

17. The hose shroud of claim 12, comprising a vinyl material covering an outermost layer of the plurality of tubular layers to form an outer covering.

18. A hose shroud, comprising
   a tube having a plurality of aramid fabric layers;
   a first end fitting at a first end of the tube;
   wherein said first end fitting comprises a threaded component configured to attach the shroud to a high pressure lance covering a high pressure hose and connection.

19. The hose shroud of claim 18, wherein the tube has 9-12 tubular layers of aramid fabric.

20. The hose shroud of claim 18, comprising a vinyl material covering an outermost layer of the plurality of tubular layers to form an outer covering.

21. The hose shroud of claim 9, wherein the high pressure hose is configured to deliver fluid of about 40,000 psi.

* * * * *